United States Patent [19]

Drott

[11] Patent Number: 5,429,425
[45] Date of Patent: Jul. 4, 1995

[54] WHEEL BRAKE UNIT FOR A MODULAR BRAKE SYSTEM

[75] Inventor: Peter Drott, Frankfurt am Main, Germany

[73] Assignee: Alfred Teves GmbH, Germany

[21] Appl. No.: 87,803

[22] PCT Filed: Dec. 19, 1991

[86] PCT No.: PCT/EP91/02448

§ 371 Date: Jul. 14, 1993

§ 102(e) Date: Jul. 14, 1993

[87] PCT Pub. No.: WO92/12880

PCT Pub. Date: Aug. 6, 1992

[30] Foreign Application Priority Data

Jan. 15, 1991 [DE] Germany .............. 41 00 966.5

[51] Int. Cl.⁶ .................................... B60T 13/74
[52] U.S. Cl. .................................... 303/3; 303/15; 303/113.4; 303/116.3
[58] Field of Search ............... 303/3, 7, 10, 11, 15, 303/20, 116.3, 113.4, DIG. 1–DIG. 4; 188/18 A

[56] References Cited

U.S. PATENT DOCUMENTS

| 3,790,225 | 2/1974 | Wehde | 303/113.4 |
|---|---|---|---|
| 4,090,739 | 5/1978 | Iio | 303/116.3 X |
| 4,197,926 | 4/1980 | Youngdale | 188/18 A |
| 4,340,258 | 7/1982 | Farr . | |
| 4,435,021 | 3/1984 | Hoenick | 303/10 |
| 5,106,167 | 4/1992 | Matsuda | 303/15 |

FOREIGN PATENT DOCUMENTS

| 0025714 | 3/1981 | European Pat. Off. . | |
|---|---|---|---|
| 0310461 | 4/1989 | European Pat. Off. . | |
| 2601310 | 1/1988 | France . | |
| 2128169 | 12/1972 | Germany . | |
| 3049911 | 3/1982 | Germany . | |
| 242724 | 2/1987 | Germany . | |
| 3901257 | 8/1989 | Germany . | |
| 3807056 | 9/1989 | Germany . | |
| 1359487 | 7/1974 | United Kingdom | 303/116.3 |
| 2252598 | 8/1992 | United Kingdom | 303/116.3 |

OTHER PUBLICATIONS

Walter Schweizer, "Werkstattpraxis-PKW Anti-Blocker Systeme," Krafthand Verlag Walter Schulz, Bad Worishofen, pp. 36–43 (1.Auflage 1988).

Primary Examiner—Robert J. Oberleitner
Assistant Examiner—Lee W. Young
Attorney, Agent, or Firm—Ratner & Prestia

[57] ABSTRACT

An independent wheel brake unit for an automotive vehicle is furnished with a hydraulic wheel brake (12), a hydraulic pump (2), an accumulator (6) and electrically actuated valves (9, 10, 11) for controlling the brake pressure. The hydraulic pump generates the actuating pressure required for actuating the wheel brake (12) by receiving the kinetic energy of the vehicle through the vehicle wheel. Because the wheel brake unit supplies itself with energy, fuel is saved and the complexity of the electrical wiring system of the automotive vehicle is reduced. All essential components of the unit together with the steering knuckle (16) of the automotive vehicle can be pre-assembled and mounted on the vehicle, as a unit, preferably in an automatic manner, by a robot, thereby substantially reducing the final-assembly costs.

8 Claims, 6 Drawing Sheets

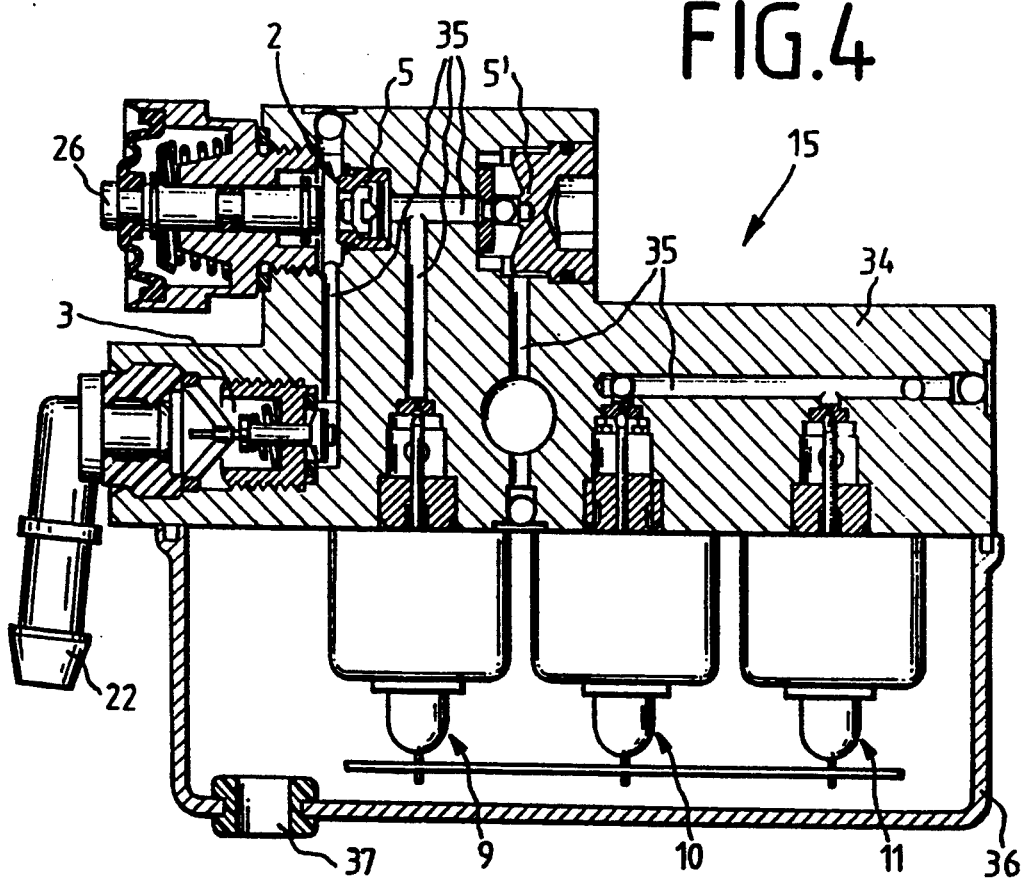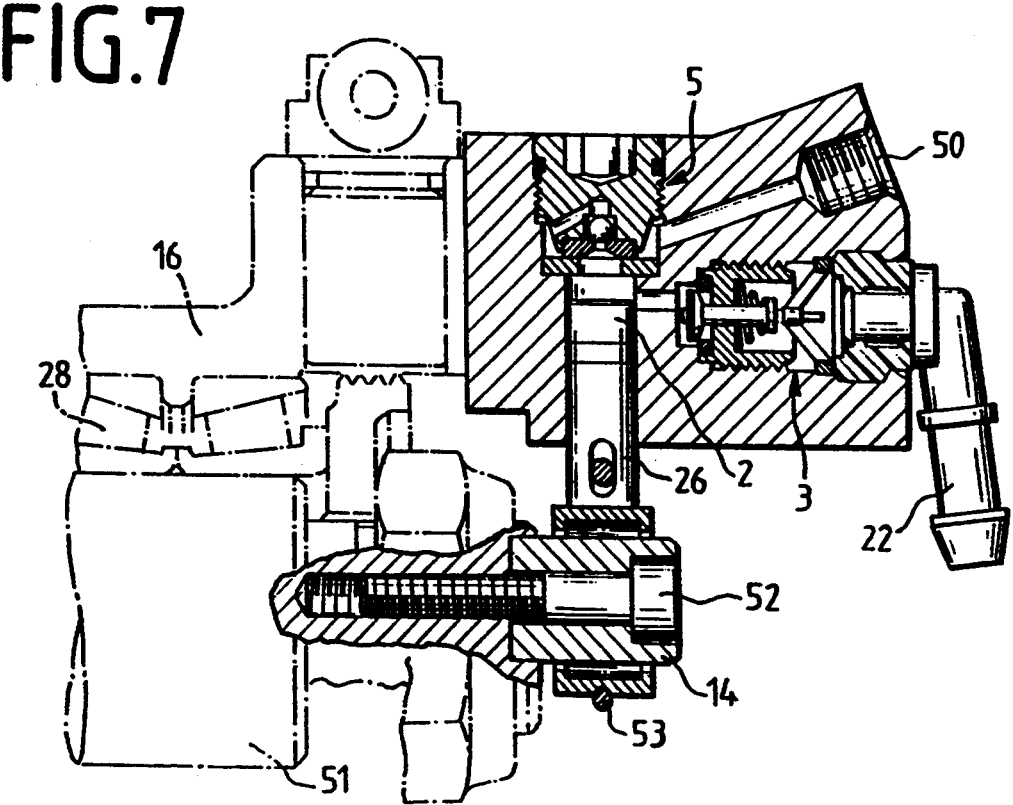

WHEEL BRAKE UNIT FOR A MODULAR BRAKE SYSTEM

BACKGROUND OF THE INVENTION

The present invention is concerned with an independent wheel brake unit for a modular brake system of an automotive vehicle.

Conventional brake systems for automotive vehicles are designed as hydraulic or pneumatic brake systems. Essentially, they are composed of a central actuator which, through supply conduits, communicates with the wheel brakes which are decentrally arranged in the area of the automotive wheels. The energy required for actuating the brake system is made available in the central actuator and, with the aid of supply conduits, is distributed among the wheel brakes. Also, the hydraulic pressure of the wheel brakes is controlled through the supply conduits.

In a simple hydraulic brake system, the actuator, through a brake pedal, is controlled by the driver and at the same time is provided with energy. In more complex brake systems, the control of the wheel brakes is supplemented, for example, by an anti-locking system (ABS) or an automatic slip control (ASR) while the energy supply is supplemented by a brake force booster or a hydraulic pump. Such additional assemblies and systems are disposed centrally and obtain their energy from the engine of the automotive vehicle, in general indirectly, through the electrical wiring system of the automotive vehicle.

However, conventional brake systems of the above-mentioned type require substantial mounting efforts. Requiring substantial mounting efforts is in opposition to the requirements of modern automobile construction, which attempt to reduce final-assembly costs. In addition to the wheel brakes, a plurality of other central units are required to be assembled and interconnected, which substantially contributes to the high cost of assembly. The placement and connection of hydraulic conduits and hoses are particularly costly and susceptible to trouble. Moreover, electrical conduits for data communication, e.g. for the connection of rotary speed sensors on the vehicle wheel to the central ABS-control unit, are required.

A wheel brake unit for automotive vehicles is disclosed by United Kingdom Patent No. 1,359,487. In this system, a hydraulic wheel brake, a hydraulic pump, and control valves, in conjunction with a sensor for determining the rotational speed of the vehicle wheel and with an associated electronic control element, are combined as a unit and mounted on the vehicle wheel. However, the pump alone is not responsible for brake operation, but it operates solely to modulate the hydraulic pressure in the wheel brake. In general, brake operation is performed in a conventional fashion via a hydraulic pressure line which conveys the actuating energy in the form of hydraulic pressure from a central supply unit, e.g. a master brake cylinder, to the wheel brakes. In this respect, this known wheel brake unit does not differ greatly from the arrangements referred to above.

Another disadvantage of conventional brake systems resides in that they obtain their energy from the electrical energy supply system of the automotive vehicle. In modern automobiles, the electrical wiring system is loaded by an increasing number of consumers of electricity. In consequence thereof, the power supply and the network must be modified to accommodate the increased number of consumers, thereby raising the costs of manufacture. Finally, reference should be made to the increasing energy consumption virtually resulting in an increased fuel consumption, which is unacceptable in view of the pollution problems involved therewith.

German patent DE 2,128,169 teaches an electrically-operated brake system. In this system, a wheel brake, in conjunction with electric actuating elements and control elements, is provided as a unit and mounted on the vehicle wheel. However, the electric control of the brake operation is performed from a central point in the vehicle, and the electric energy is supplied from a central point in the vehicle. Also, the electrical wiring system is under stress.

SUMMARY OF THE INVENTION

The present invention contributes to an improved brake system for automotive vehicles, thereby avoiding all disadvantages involved with conventional brake systems, especially regarding final-assembly efforts and energy consumption.

In a system according to the present invention, not only the wheel brake but also the supply and control assemblies required for the actuation thereof are provided in the area of the vehicle wheel. The arrangement according to the invention will completely eliminate at least one hydraulic conduit network, one central master actuating cylinder and one pressure control for the rear wheel brakes as well as the manufacturing and assembling costs involved therewith. The actuating energy for the brake is generated from the kinetic energy of the automotive vehicle, thereby eliminating, on the one hand, a separate electrical supply conduit and, on the other hand, contributing to fuel savings.

Moreover, the complexity of the electrical wiring system of the automotive vehicle is reduced, thereby ensuring another cost advantage. The elimination of hydraulic conduits, master cylinders and controllers will decrease the volume requirements of the brake system and, hence, of the required actuating energy by, approximately, an additional 25%.

An alternative embodiment of the present invention involves an extension of the brake system, and ensures an additional advantage of the modular brake system. For example, the brakes of a trailer equipped with the brake unit according to the invention can be integrated without any substantial efforts and can be actuated by the central actuator unit of the tractor.

According to an embodiment of the present invention, the hydraulic pump is particularly simple, rugged and inexpensive. In this embodiment, the hydraulic pump is a piston pump actuated by a cam of the wheel hub or wheel axle.

In a preferred embodiment of the present invention, the components intended for the supply of the brake and for the control of the brake pressure are combined to form a compact hydraulic assembly. These components include the hydraulic pump, the accumulator and the valves for controlling the flow of hydraulic fluid. According to another embodiment, this compact hydraulic assembly is fixed to the steering knuckle of the automotive vehicle.

According to another embodiment of the present invention, the wheel brake is additionally to be incorporated into the unit as formed, thereby creating a compact brake assembly. This brake assembly may be, advantageously, fixed to the steering knuckle of the automotive vehicle. In this connection, the hydraulic pump may be integrated into the brake assembly or may be formed as a separate component located directly in a side-by-side relationship with the wheel hub.

According to a particularly low-cost embodiment of the present invention, all essential components along with the steering knuckle are supplied in the form of a pre-assembled unit which, in the final assembly of the vehicle, is mounted by a few hand-grips or otherwise, automatically, with the aid of a robot. These essential components include the wheel brake, the pump, the accumulator, and the valves. The difficulty in connecting the brake system to the supply system of the automotive vehicle during final assembly is substantially reduced. Substantially only an electrical control conduit is required to be connected. The modular brake system, in addition, is very clearly arranged and is easy to service.

According to another embodiment of the present invention, the wheel brake assembly is further improved by the incorporation of a microprocessor. The microprocessor controls the brake pressure and, through a data bus system, directly or indirectly, is in communication, by a central processor, with the central actuator unit in the vehicle.

Such an arrangement is particularly advantageous once the vehicle is furnished with a data bus system or a central processor. Future developments will permit transmission of data flow in the vehicle more clearly and uniformly, thereby avoiding an uneconomically high number of signal cables.

According to an alternative embodiment of the present invention, the microprocessor comprising a data bus on the vehicle wheel performs part of the anti-locking and anti-slip control. By individually pre-evaluating the sensor signals and by precisely controlling the setting elements by predetermined nominal values, excellent control properties will result.

Moreover, other important values and functional features such as pad wear in the wheel brake or tire pressure, can be monitored by the microprocessor with the aid of suitable sensors. If necessary, the control of neighboring systems also can be integrated. This relates, for example, to automatic tire pressure control, height adjustment of the chassis or control of the damping properties thereof.

BRIEF DESCRIPTION OF THE DRAWING

Two embodiments of the invention will now be described in closer detail with reference to the drawings, wherein

FIG. 4 is a partial view taken along line 4—4 of FIG. 2;

FIG. 7 is a sectional view taken along line 7—7 of FIG. 6.

DETAILED DESCRIPTION OF THE INVENTION

Figure 1:
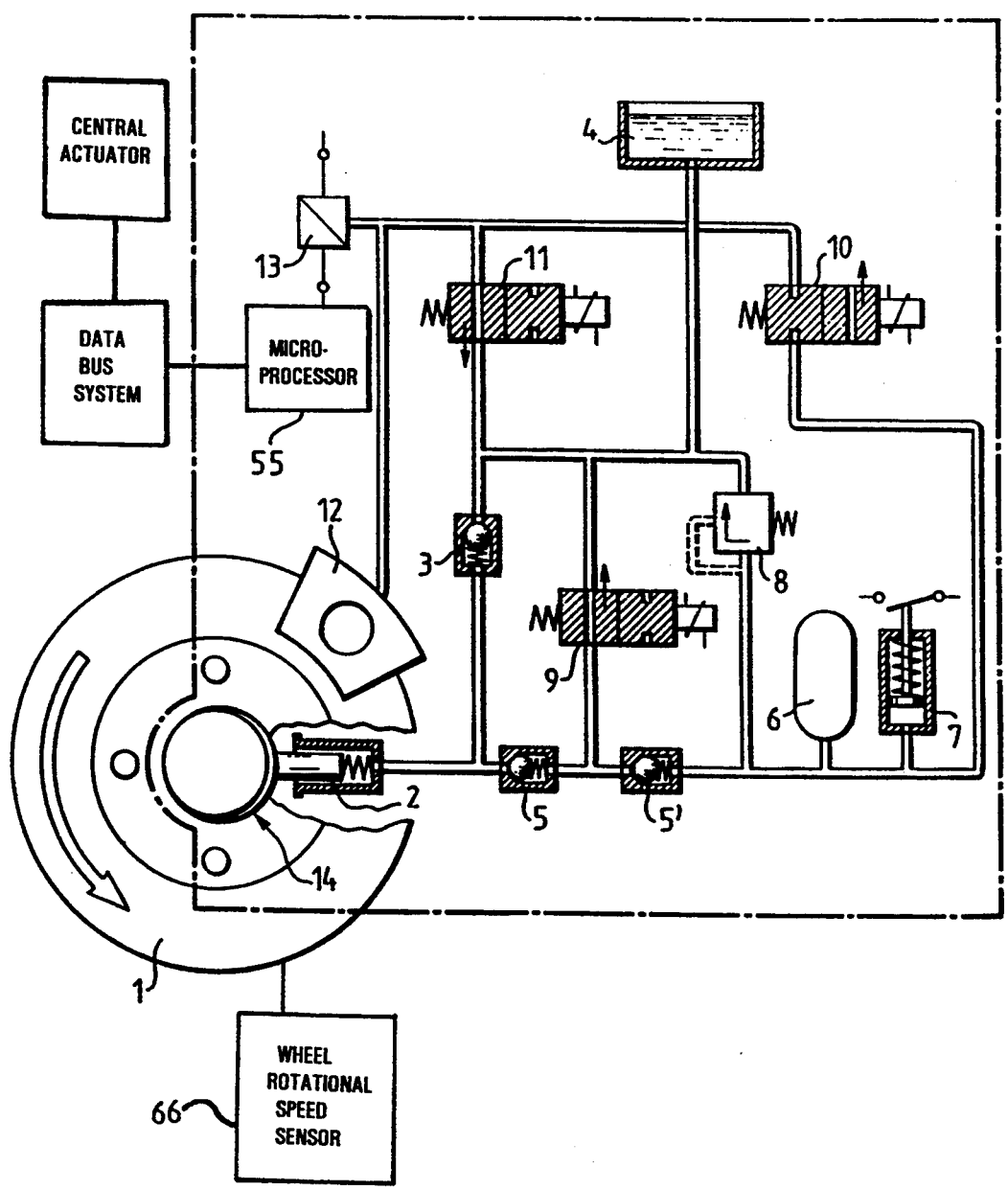
FIG. 1 shows a schematic hydraulic circuit configuration having a wheel brake unit according to the present invention.

To explain the operation of a wheel brake unit according to the present invention, the wheel brake unit is schematically shown in FIG. 1 in the form of a hydraulic circuit configuration, showing a brake disk 1 of the vehicle wheel comprising a disk brake 12. A hydraulic piston pump 2, through a cam 14 disposed on the wheel hub, is driven by the vehicle wheel. The pump draws hydraulic fluid from the reservoir 4, through the intake valve 3, and pumps hydraulic fluid through the pressure valves 5, 5', into the accumulator 6.

Once the maximum permitted pressure is reached, a pressure switch 7 is actuated. The pressure switch 7, by means of an electric circuit (not shown), opens a short-circuit valve 9 to be electrically actuated, thereby decreasing the pressure between the valves 5 and 5'. Hydraulic fluid now flows, through valves 3, 5 and 9, in the circuit. However, due to the closed pressure valve 5', the pressure in the accumulator 6 is maintained. For safety reasons, a pressure relief valve 8 is provided between the accumulator 6 and the non-pressurized reservoir 4, through which, in case of emergency, an unacceptably high pressure is decreased.

In another embodiment (not shown), upon reaching the maximum pressure in the accumulator 6, the piston pump 2 is switched off. This is accomplished by lifting the piston 26 (shown in FIGS. 6 and 7) of the pump, through an additional electrically or hydraulically actuated means, off the cam 14, thereby substantially or completely avoiding frictional losses.

To initiate a braking operation, the electrically actuated pressure increasing valve 10 is opened so that hydraulic fluid can flow from the accumulator 6 into the wheel brake 12. Thus, hydraulic pressure is built up within the wheel brake 12, and the brake shoes are forced against the brake disk 1. For releasing the brake, the pressure increasing valve 10 is closed, and the pressure decreasing valve 11 is opened through which hydraulic fluid can flow from the wheel brake 12 back into the reservoir 4. Thus, the hydraulic pressure in the wheel brake 12 is decreased.

The brake pressure prevailing in the wheel brake 12 is measured by an electrical pressure sensor 13. The pressure sensor 13 is electrically connected to a microprocessor 55. The microprocessor 55 compares a predetermined nominal value to the actual value of the brake pressure measured by the pressure sensor 13, switching the valves 10, 11 until the predetermined value is adjusted. The brake pressure is predetermined either by the driver of the vehicle by means of an electrical brake pedal (i.e. a central actuator capable of generating electrical signals representative of the level of depression by the driver), or is computed by an anti-locking or anti-slip control circuit. A wheel rotational speed sensor 66 may be provided for sensing the rotational speed of the wheel and communicating signals representative of the wheel rotational speed to the microprocessor 55.

Figure 2:
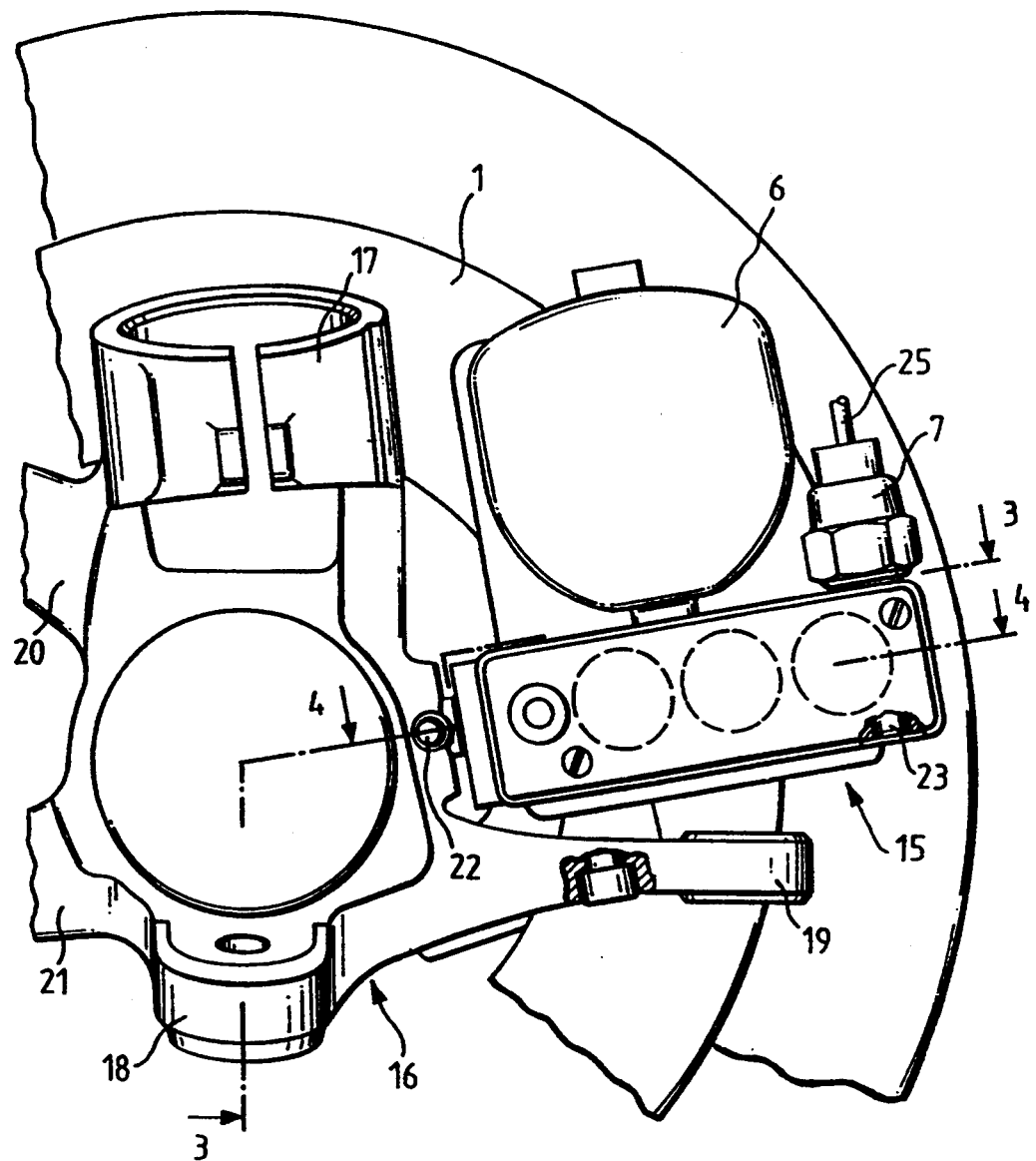
FIG. 2 is a partial view of a steering knuckle with a built-in hydraulic assembly according to a first embodiment of the present invention.

According to the first embodiment of the wheel brake unit, the hydraulic pump 2, the valves 3, 5, 5', 8, 9, 10, 11, the accumulator 6, the pressure switch 7 and the pressure sensor 13 are combined in a compact hydraulic assembly 15 to form one unit which, as shown in FIG. 2, is fixed to the steering knuckle 16 of the automotive vehicle. The steering knuckle 16 is provided with arms 17, 18, 19 that are intended for anchoring to the spring strut 43 of the vehicle (shown in FIG. 6) and for fixation of a steering mechanism. Two additional arms 20, 21, in a known manner, carry a disk brake 12 (also see FIG. 6) gripping laterally about the brake disk 1. Provided on the hydraulic assembly 15 are the pressure accumulator 6, a nipple 22 for connection with a hose for communication with the reservoir 4 (not shown) which is secured, for example, in the wheel box of the vehicle, a tapped hole 23 for connection of a hydraulic conduit leading to a brake (not shown), and the pressure switch 7 with an electrical cable 25 leading to the microprocessor 55.

Figure 3:
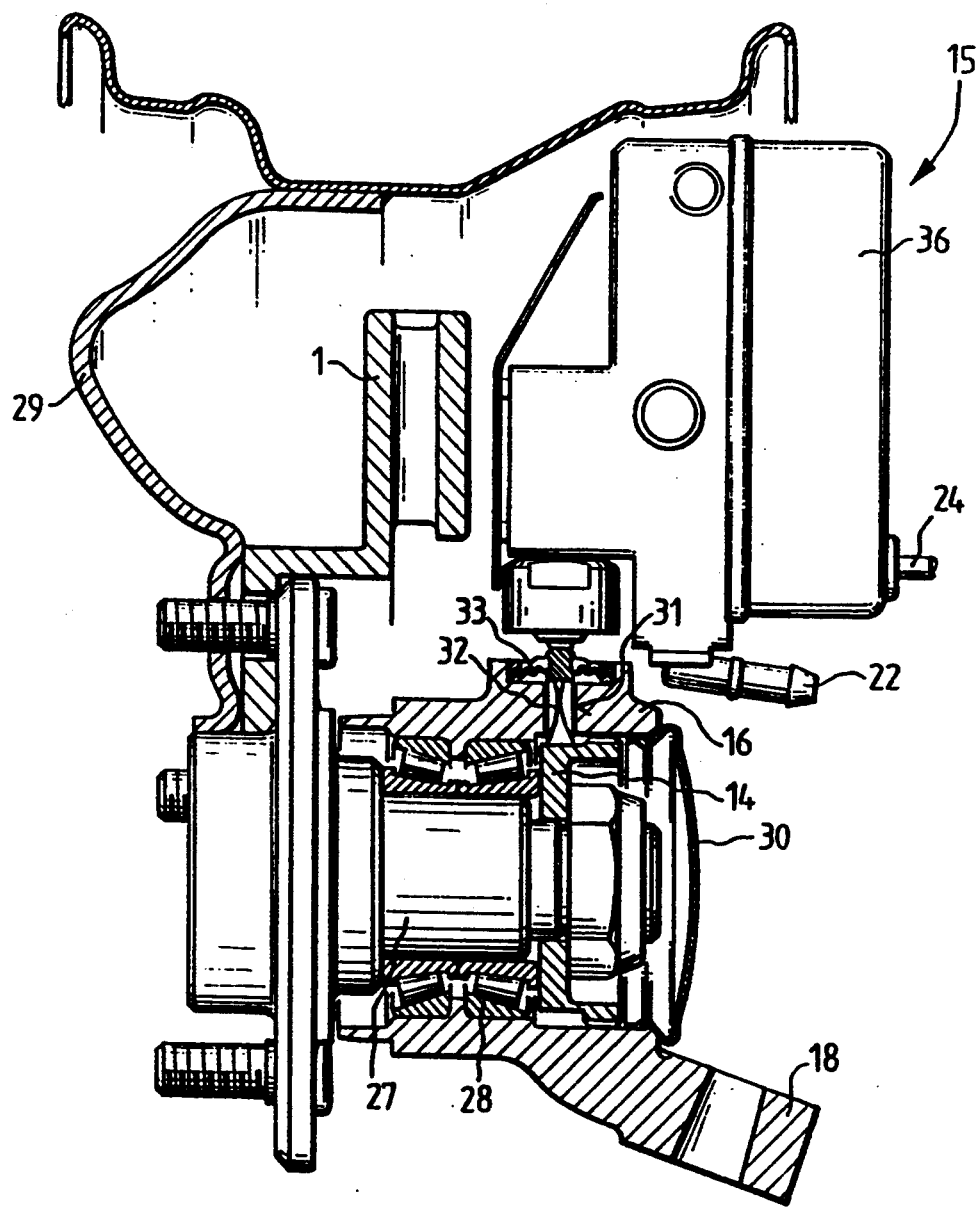
FIG. 3 is a sectional view taken along line 3—3 of FIG. 2.

FIG. 3 is a sectional view of the arrangement according to FIG. 2 (3—3). The wheel hub 27, through a wheel bearing 28, is rotationally secured to the steering knuckle 16. It carries, at the axial outer end, the brake disk 1 and the wheel rim 29, and at the axial inner end thereof, it carries the cam 14. The wheel bearing 28 and the cam 14 are protected by means of a protective cap 30 against the ingress of dirt and dust.

Disposed in a radial bore 31 of the steering knuckle 16, in the area of the wheel hub 27, is a plunger 32, the radial inner end of which slides on the outer surface of the cam 14. Once the vehicle wheel rotates along with the cam 14, the plunger 32 is reciprocated toward and away from the longitudinal axis thereof. The radial outer end of the plunger 32 is in contact with the piston 26 of the hydraulic pump 2 in the hydraulic assembly 15, transferring thereto its motion to actuate the pump 2. An elastic collar 33, in close abutment with the circumferential face of the plunger 32, protects the interior against dust and dirt and follows the motion of plunger 32.

The internal construction of the hydraulic assembly 15 is disclosed in FIG. 4. FIG. 4 shows the nipple 22 for connection with a hose leading to the reservoir 4 (not shown), the intake valve 3, the hydraulic pump 2 with piston 26, the pressure valves 5, 5', the short-circuit valve 9, the pressure increasing valve 10 and the pressure decreasing valve 11. The components referred to are forced or screwed into a metal block 34 and are interconnected through bored passageways 35 for the hydraulic fluid. The electrical actuating means of the valves 9, 10, 11 protrude from the metal block 34 and, through a lid 36, are protected against environmental influences. The lid 36 comprises an aperture 37 for passage of the electric cable 24 (see FIG. 3) interconnecting the valves 9, 10, 11 to the microprocessor 55.

Figure 5:
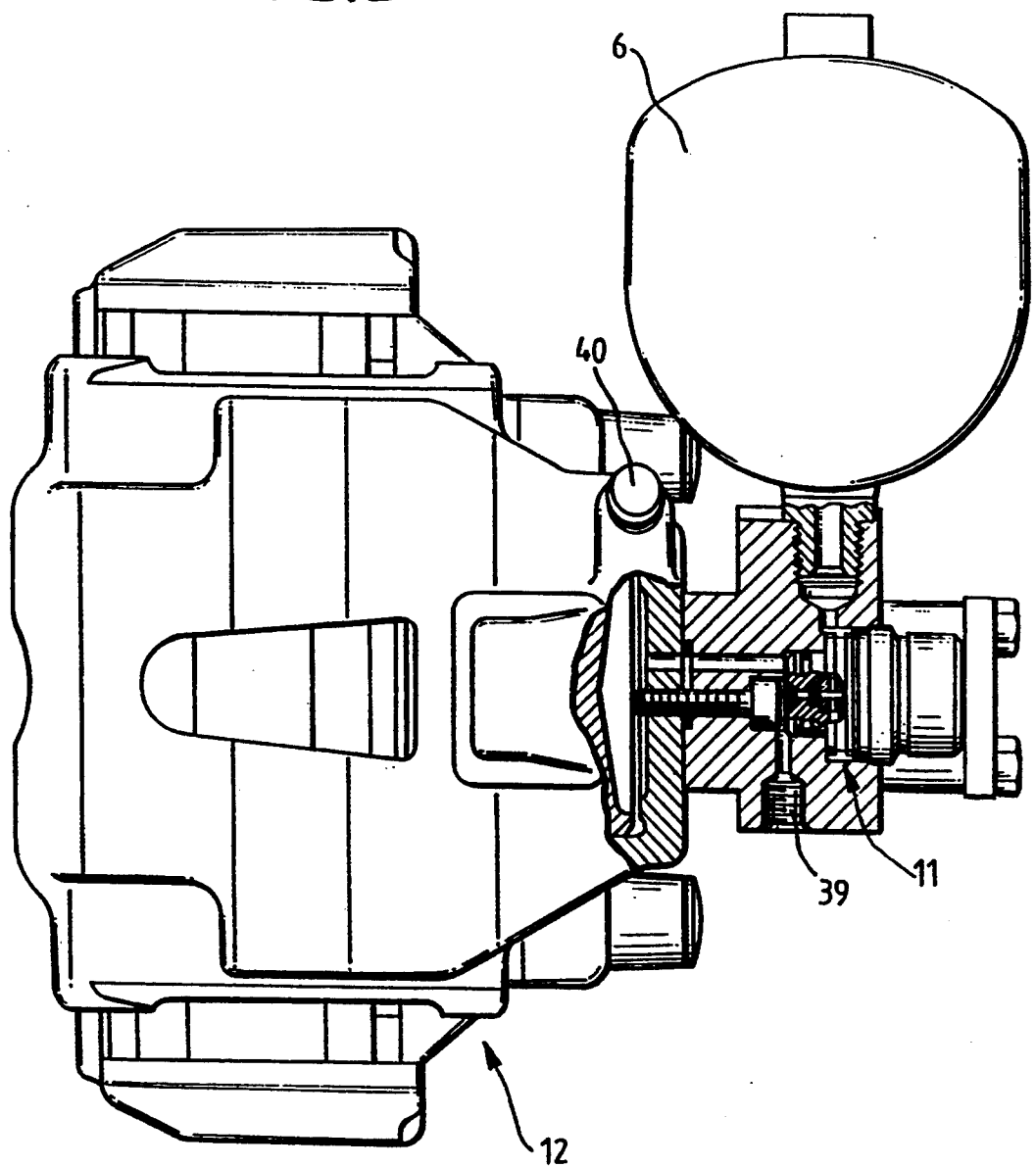
FIG. 5 is partial sectional plan view of a brake assembly.

In another embodiment of the wheel brake unit, the wheel brake 12, the pressure increasing valve 10, the pressure decreasing valve 11 and the pressure accumulator 6 are combined to form a compact brake assembly 38, as shown in FIG. 5. The assembly includes wheel brake 12 with the bleeder valve 40, the pressure accumulator 6, the pressure decreasing valve 11 and the outlet 39 for connection of a hydraulic conduit for returning hydraulic fluid to the reservoir 4.

Figure 6:
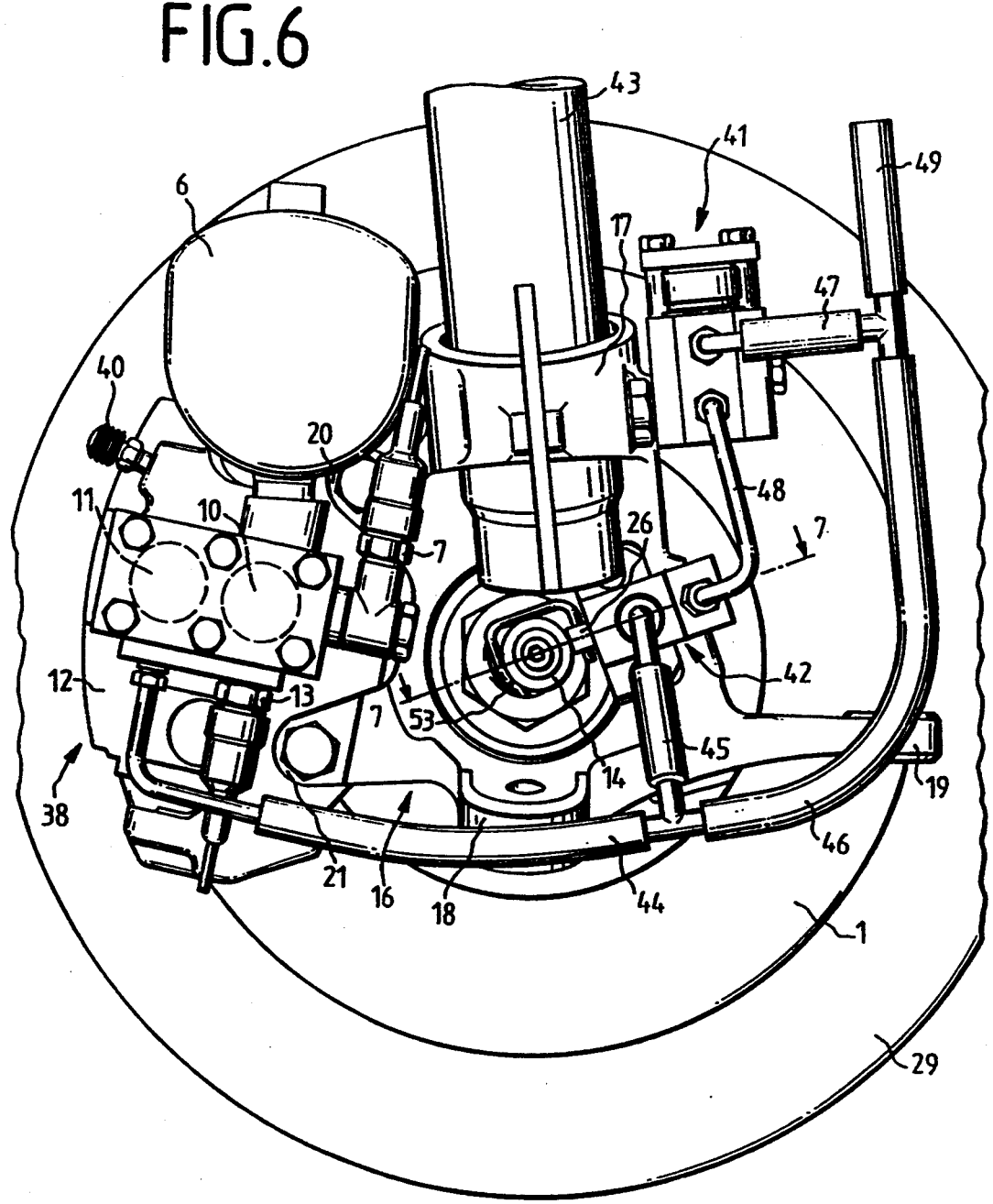
FIG. 6 is a plan view of a wheel brake unit according to a second embodiment of the present invention.

FIG. 6 shows the mounted wheel brake unit with the brake assembly 38, a pump unit 42 and a valve unit 41, all fixed to the steering knuckle 16 and mounted therewith as a pre-assembled unit. The units are interconnected by hydraulic conduits 44, 45, 46, 47, 48 which, in part, are in the form of hoses. A hose 49 leads to the reservoir 4 (not shown) which is fixed, for example, in the wheel box. The valve unit 41 contains the short-circuit valve 9 and the pressure valve 5'. Through an additional hydraulic conduit (not shown), valve unit 41 is in communication with the brake assembly 38.

The design and operation of the pump unit 42 are revealed by FIG. 7. FIG. 7 shows the nipple 22 for connection to a hydraulic hose (e.g. conduit 45 of FIG. 6) leading to the reservoir 4, the intake valve 3, the hydraulic pump 2 with piston 26, the pressure valve 5 and an outlet 50 for connection to a hydraulic conduit (e.g. conduit 48 of FIG. 6) leading to the valve unit 41. The pump unit 42 is fixed to the steering knuckle 16 also carrying the wheel bearing 28. Secured by means of nut 52 to the inner end of the wheel axle 51 is a cam 14. The piston 26 is directly actuated by cam 14. A bracket 53 insures that the piston 26 not only is forced toward pump 2 but is also drawn in the opposite direction (see also FIG. 6), while the pump 2 takes in hydraulic fluid.

I claim:

1. A compact, hydraulic, modular wheel brake unit for controlling hydraulic pressure in a hydraulically actuatable wheel brake of a wheel of an automotive vehicle having a central actuator, a steering knuckle and a reservoir for supplying hydraulic fluid, wherein said wheel includes a wheel axle and a cam mounted on the wheel axle, said modular wheel brake unit comprising:

a hydraulic piston pump driven by the cam of the wheel for pressurizing hydraulic fluid;

an accumulator for storing pressurized hydraulic fluid from said hydraulic piston pump;

hydraulic fluid flow control means, electrically responsive to the central actuator of the vehicle, for conducting hydraulic fluid between said hydraulic piston pump, said accumulator, the wheel brake, and the reservoir and for controlling the hydraulic pressure in the wheel brake and including:

(a) an electrically actuatable pressure increasing valve, disposed between said accumulator and the wheel brake, for opening to permit hydraulic fluid flow from said accumulator to the wheel brake to increase the hydraulic pressure of the wheel brake, (b) an electrically actuatable pressure decreasing valve, disposed between the wheel brake and the reservoir, for opening to permit hydraulic fluid flow from the wheel brake to the reservoir to decrease the hydraulic pressure of the wheel brake, (c) an intake valve, disposed between the reservoir and said hydraulic piston pump, for permitting hydraulic fluid flow from the reservoir to said hydraulic piston pump and preventing hydraulic fluid flow from said hydraulic piston pump to the reservoir, (d) a first pressure valve, disposed adjacent said hydraulic piston pump, for permitting hydraulic fluid flow away from said hydraulic piston pump and preventing hydraulic fluid flow toward said hydraulic piston pump, (e) a second pressure valve, disposed between said first pressure valve and said accumulator, for permitting hydraulic fluid flow from said first pressure valve to said accumulator and preventing hydraulic fluid flow from said accumulator to said first pressure valve, and (f) an electrically actuatable short circuit valve, disposed between the reservoir and a point between said first pressure valve and said second pressure valve, at which point a maximum allowable pressure exists, for permitting hydraulic fluid flow from the point between said first pressure valve and said second pressure valve when said maximum allowable pressure is exceeded; and said wheel brake unit arranged in the area of the vehicle wheel and directly secured to the steering knuckle.

2. A wheel brake unit according to claim 1, wherein said steering knuckle is coupled to the wheel brake.

3. A wheel brake unit according to claim 1, wherein said modular wheel brake unit is connected to said central actuator only through electrical control conduits.

4. A modular wheel brake assembly for controlling hydraulic pressure in a hydraulically actuatable wheel brake of a wheel of an automotive vehicle having a central actuator, a steering knuckle and a reservoir for supplying hydraulic fluid, wherein said wheel includes a wheel axle and a cam mounted on the wheel axles, said modular wheel brake assembly comprising:

a brake component directly coupled to the steering knuckle and responsive to actuation of the wheel brake;

a hydraulic piston pump proximate to said brake component and driven by the cam of the wheel for pressurizing hydraulic fluid;

an accumulator proximate to said brake component for storing pressurized hydraulic fluid from said hydraulic piston pump; and hydraulic fluid flow control means, proximate to said brake component and electrically responsive to the central actuator of the vehicle, for conducting hydraulic fluid between said hydraulic piston pump, said accumulator, the wheel brake, and the reservoir and for controlling the hydraulic pressure in the wheel brake and including:

(a) an electrically actuatable pressure increasing valve disposed between said accumulator and the wheel brake, for opening to permit hydraulic fluid flow from said accumulator to the wheel brake to increase the hydraulic pressure of the wheel brake, (b) an electrically actuatable pressure decreasing valve, disposed between the wheel brake and the reservoir, for opening to permit hydraulic fluid flow from the wheel brake to the reservoir to decrease the hydraulic pressure of the wheel brake, (c) an intake valve, disposed between the reservoir and said hydraulic piston pump, for permitting hydraulic fluid flow from the reservoir to said hydraulic piston pump and preventing hydraulic fluid flow from said hydraulic piston pump to the reservoir, (d) a first pressure valve, disposed adjacent said hydraulic piston pump, for permitting hydraulic fluid flow away from said hydraulic piston pump and preventing hydraulic fluid flow toward said hydraulic piston pump, (e) a second pressure valve, disposed between said first pressure valve and said accumulator, for permitting hydraulic fluid flow from said first pressure valve to said accumulator and preventing hydraulic fluid flow from said accumulator to said first pressure valve, and (f) an electrically actuatable short circuit valve, disposed between the reservoir and a point between said first pressure valve and said second pressure valve, at which point a maximum allowable pressure exists, for permitting hydraulic fluid flow from the point between said first pressure valve and said second pressure valve when said maximum allowable pressure is exceeded.

5. A wheel brake assembly according to claim 4, wherein said brake component is a brake disk.

6. A modular wheel brake unit for controlling hydraulic pressure in a hydraulically actuatable wheel brake of a wheel of an automotive vehicle having a central actuator, a steering knuckle coupled to the wheel brake, and a reservoir for supplying hydraulic fluid, said modular wheel brake unit comprising:

a hydraulic pump driven by the wheel for pressurizing hydraulic fluid;

an accumulator for storing pressurized hydraulic fluid from said hydraulic pump;

hydraulic fluid flow control means, electrically responsive to the central actuator of the vehicle, for conducting hydraulic fluid between said hydraulic pump, said accumulator, the wheel brake, and the reservoir and for controlling the hydraulic pressure in the wheel brake and including:

(a) an electrically actuatable pressure increasing valve, disposed between said accumulator and the wheel brake, for opening to permit hydraulic fluid to flow from said accumulator to the wheel brake to increase the hydraulic pressure of the wheel brake, (b) an electrically actuatable pressure decreasing valve, disposed between the wheel brake and the reservoir, for opening to permit hydraulic fluid flow from the wheel brake to the reservoir to decrease the hydraulic pressure of the wheel brake, (c) a first pressure valve, disposed near said hydraulic pump, for permitting hydraulic fluid flow in the direction from said hydraulic pump and preventing hydraulic fluid flow in the direction to said hydraulic pump, (d) a second pressure valve, disposed between said first pressure valve and said accumulator, for permitting hydraulic fluid flow from said first pressure valve to said accumulator and preventing hydraulic fluid flow from said accumulator to said first pressure valve, and (e) an electrically actuatable short circuit valve, disposed between the reservoir and a point between said first pressure valve and said second pressure valve, at which point a maximum allowable pressure exists, for permitting hydraulic fluid flow from the point between said first pressure valve and said second pressure valve when said maximum allowable pressure is exceeded; and said wheel brake unit arranged in the area of the vehicle wheel and directly secured to the steering knuckle.

7. A modular wheel brake unit for controlling hydraulic pressure in a hydraulically actuatable wheel brake of a wheel of an automotive vehicle having a central actuator, a steering knuckle and a reservoir for supplying hydraulic fluid, said modular wheel brake unit comprising:

a hydraulic pump driven by the wheel for pressurizing hydraulic fluid;

an accumulator for storing pressurized hydraulic fluid from said hydraulic pump;

hydraulic fluid flow control means, electrically responsive to the central actuator of the vehicle, for conducting hydraulic fluid between said hydraulic pump, said accumulator, the wheel brake, and the reservoir and for controlling the hydraulic pressure in the wheel brake and including:

(a) an electrically actuatable pressure increasing valve, disposed between said accumulator and the wheel brake, for opening to permit hydraulic fluid flow from said accumulator to the wheel brake to increase the hydraulic pressure of the wheel brake, (b) an electrically actuatable pressure decreasing valve, disposed between the wheel brake and the reservoir, for opening to permit hydraulic fluid flow from the wheel brake to the reservoir to decrease the hydraulic pressure of the wheel brake, and (c) a first pressure valve, disposed near said hydraulic pump, for permitting hydraulic fluid flow in the direction from said hydraulic pump and preventing hydraulic fluid flow in the direction to said hydraulic pump, (d) a second pressure valve, disposed between said first pressure valve and said accumulator, for permitting hydraulic fluid flow from said first pressure valve to said accumulator and preventing hydraulic fluid flow from said accumulator to said first pressure valve, and (e) an electrically actuatable short circuit valve, disposed between the reservoir and a point between said first pressure valve and said second pressure valve, at which point a maximum allowable pressure exists, for permitting hydraulic fluid flow from the point between said first pressure valve and said second pressure valve when said maximum allowable pressure is exceeded;

a microprocessor, disposed near the wheel and in electrical communication with the central actuator of the vehicle through a data bus system, for controlling said electrically actuatable pressure increasing valve, electrically actuatable pressure decreasing valve, and said electrically actuatable short circuit valve; and said wheel brake unit arranged in the area of the vehicle wheel and directly secured to the steering knuckle.

8. A wheel brake unit according to claim 7, further comprising sensors for sensing wheel rotational speed and the hydraulic pressure in the wheel brake and for conveying signals representative of the wheel rotational speed and the hydraulic pressure to said microprocessor, wherein said microprocessor controls the hydraulic pressure in the wheel brake.

* * * * *